(12) United States Patent
Harrell

(10) Patent No.: US 8,662,014 B1
(45) Date of Patent: Mar. 4, 2014

(54) SLIDABLY POSITIONABLE PET BED ASSEMBLY

(76) Inventor: Alisa F. Harrell, Hayward, CA (US)

(*) Notice: Subject to any disclaimer, the term of this patent is extended or adjusted under 35 U.S.C. 154(b) by 0 days.

(21) Appl. No.: 13/588,176

(22) Filed: Aug. 17, 2012

(51) Int. Cl.
*A01K 29/00* (2006.01)

(52) U.S. Cl.
USPC .......................................................... 119/28.5

(58) Field of Classification Search
USPC ................ 119/28.5, 165, 161, 482, 501, 753;
312/330.1, 327, 328, 249.8, 234.3,
312/311; 5/308, 93.2, 159.1, 3–7, 95, 96
See application file for complete search history.

(56) References Cited

U.S. PATENT DOCUMENTS

| | | | |
|---|---|---|---|
| 2,312,325 A * | 3/1943 | Earle .............................. | 312/273 |
| 5,131,732 A * | 7/1992 | Lane et al. .................... | 312/190 |
| 5,144,910 A * | 9/1992 | Darby .......................... | 119/496 |
| 5,148,768 A | 9/1992 | Hinton | |
| 5,211,130 A * | 5/1993 | Elias et al. .................... | 119/28.5 |
| 6,182,612 B1 * | 2/2001 | Ross, Sr. ....................... | 119/482 |
| 6,341,829 B1 | 1/2002 | Sporn | |
| D542,056 S * | 5/2007 | Puente et al. .................. | D6/445 |
| 2005/0120968 A1 | 6/2005 | Dorsey | |
| 2006/0118051 A1 | 6/2006 | Lima | |
| 2007/0028854 A1 | 2/2007 | Chern | |
| 2007/0089683 A1 * | 4/2007 | Roberts et al. ................ | 119/477 |
| 2007/0234966 A1 * | 10/2007 | Pettys ........................... | 119/165 |
| 2013/0134850 A1 * | 5/2013 | Berkowitz ................. | 312/317.1 |

* cited by examiner

*Primary Examiner* — T. Nguyen

(57) ABSTRACT

A slidably positionable pet bed assembly includes a housing that has a top wall and a perimeter wall coupled to and extending downwardly from a perimeter edge of the top wall. A front of the housing is open to access an interior of the housing. A primary door is hingedly coupled the open front side of the housing. A drawer is positioned within the interior of the housing. The drawer is extendable outwardly from the interior of the housing. A secondary door is hingedly coupled to an upper edge of the open front side of the housing. A bed is positioned within the interior of the housing. The bed is extendable outwardly from the interior of the housing.

18 Claims, 6 Drawing Sheets

SLIDABLY POSITIONABLE PET BED ASSEMBLY

BACKGROUND OF THE DISCLOSURE

Field of the Disclosure

The disclosure relates to slidably positionable pet bed devices and more particularly pertains to a new slidably positionable pet bed device for storing article for pet care proximal the pet bed.

SUMMARY OF THE DISCLOSURE

An embodiment of the disclosure meets the needs presented above by generally comprising a housing that has a top wall and a perimeter wall coupled to and extending downwardly from a perimeter edge of the top wall. A front of the housing is open to access an interior of the housing. A primary door is hingedly coupled the open front side of the housing. A drawer is positioned within the interior of the housing. The drawer is extendable outwardly from the interior of the housing. A secondary door is hingedly coupled to an upper edge of the open front side of the housing. A bed is positioned within the interior of the housing. The bed is extendable outwardly from the interior of the housing.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
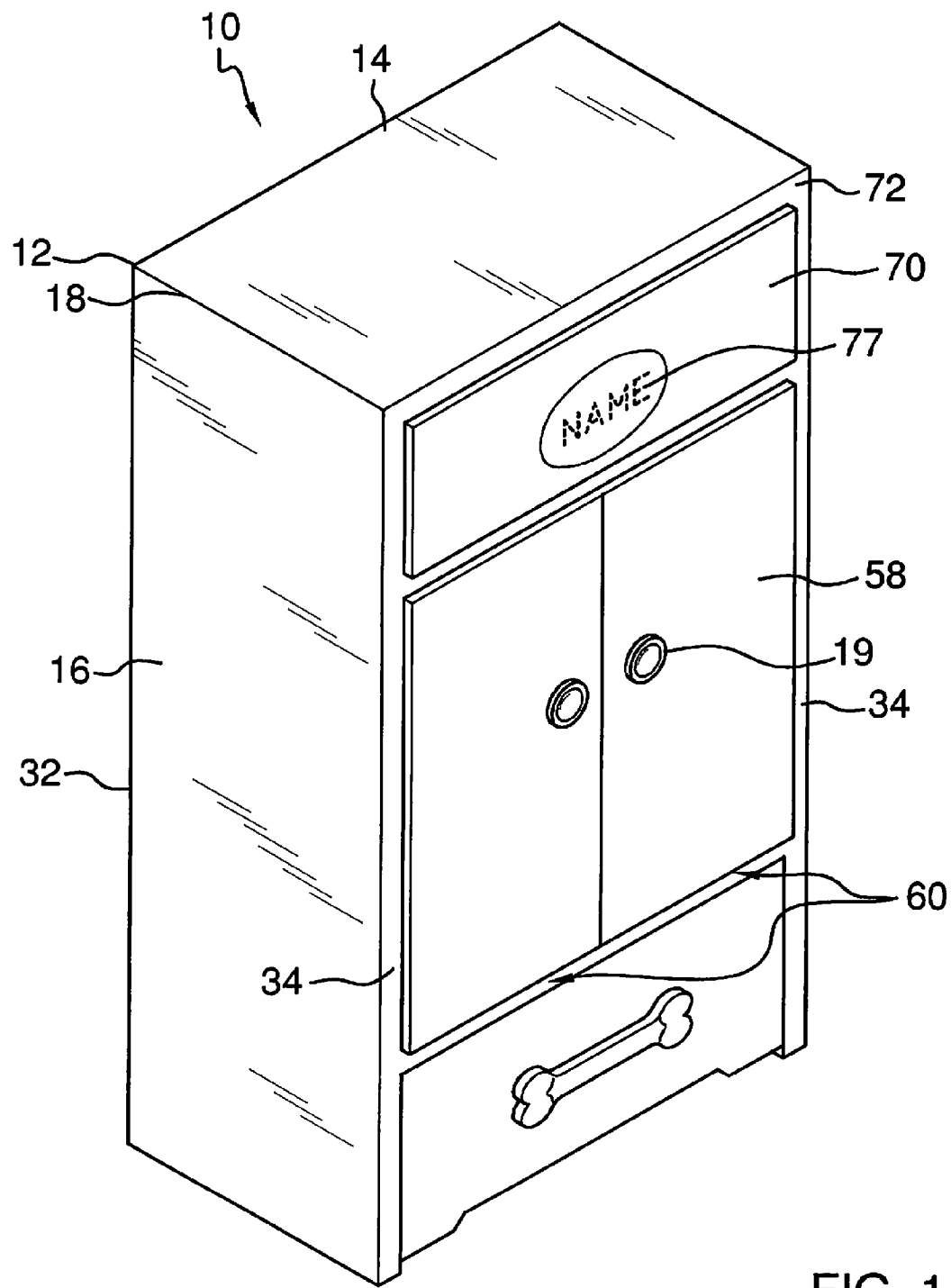
FIG. 1 is a perspective view of a slidably positionable pet bed assembly according to an embodiment of the disclosure.
Figure 2:
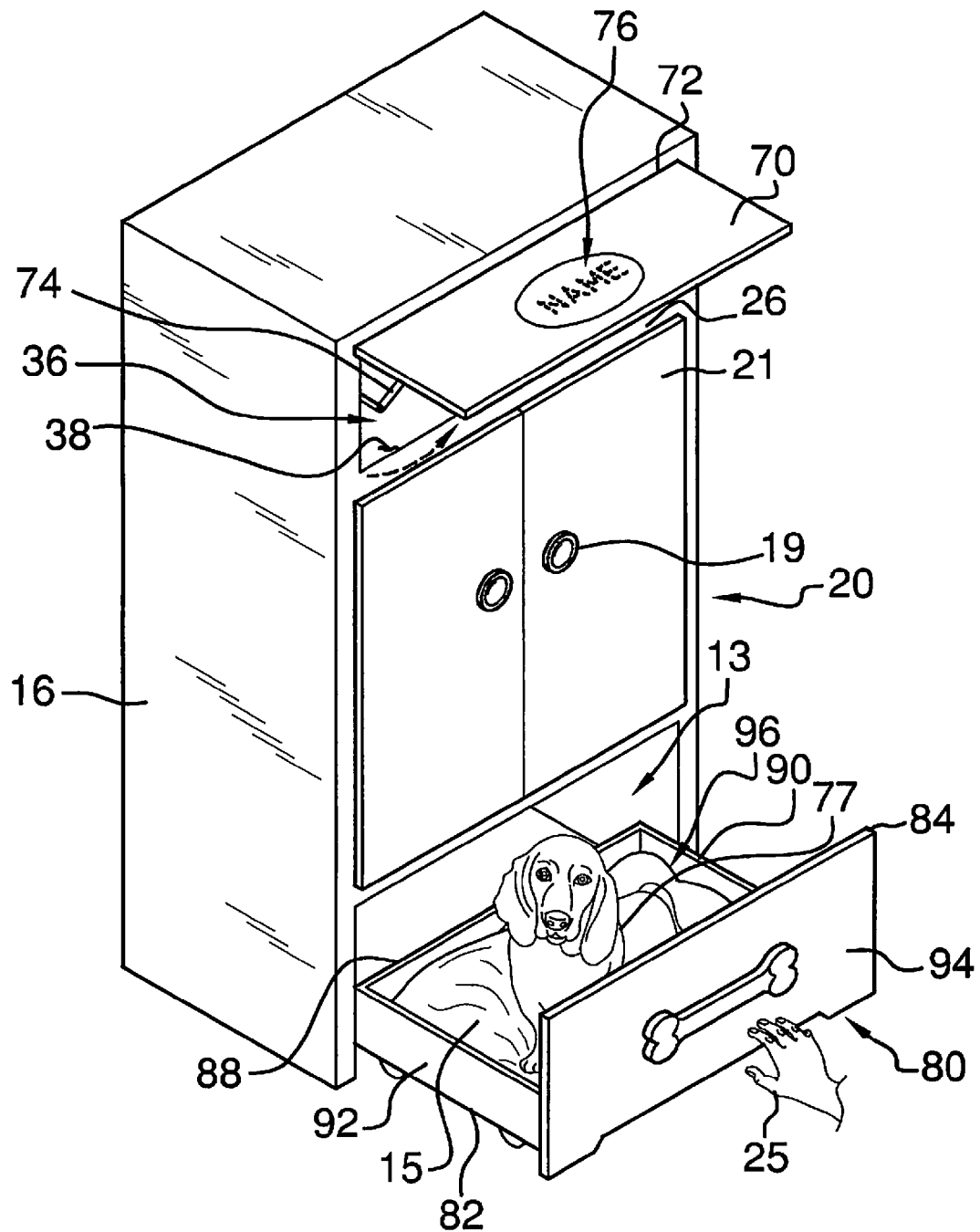
FIG. 2 is an in-use view of an embodiment of the disclosure.
Figure 3:
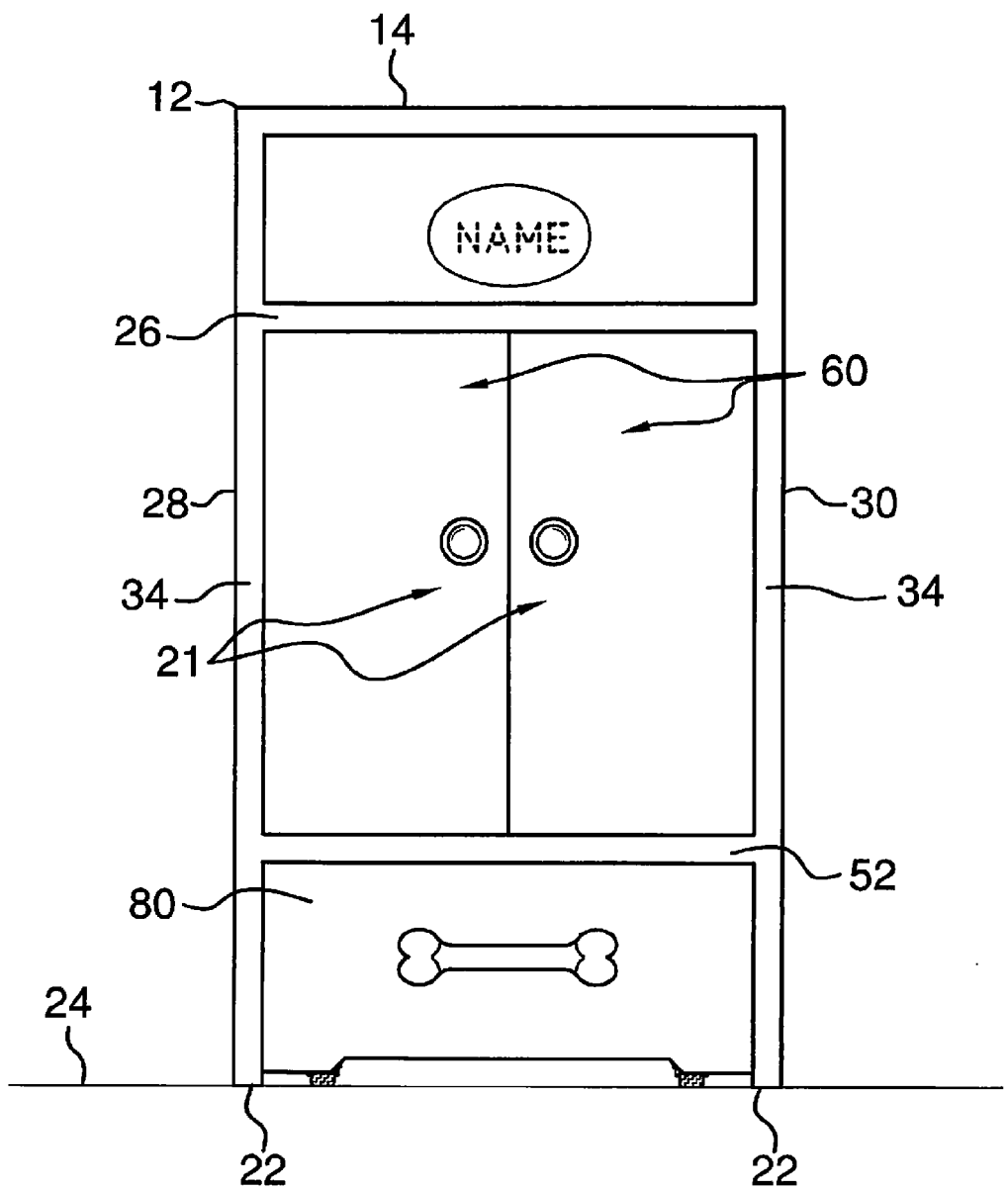
FIG. 3 is a front view of an embodiment of the disclosure.
Figure 4:
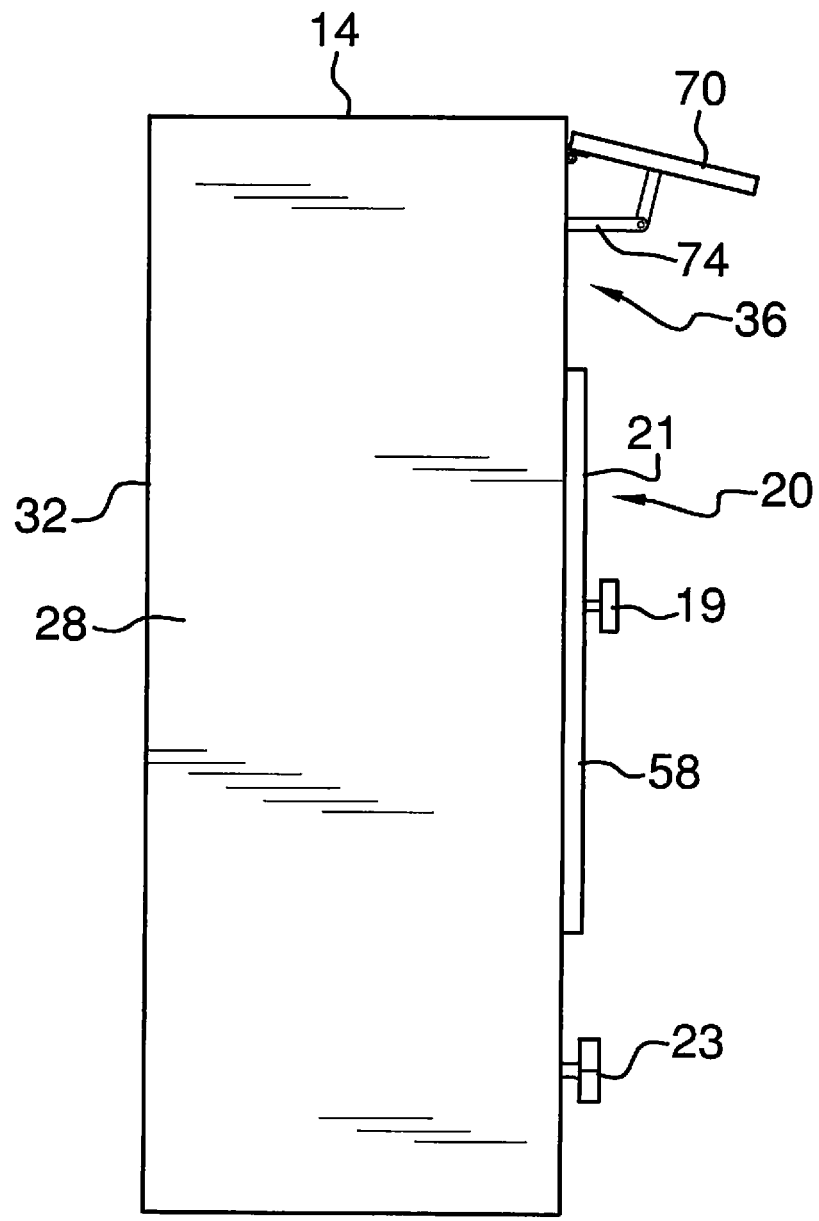
FIG. 4 is a left side view of an embodiment of the disclosure.
Figure 5:
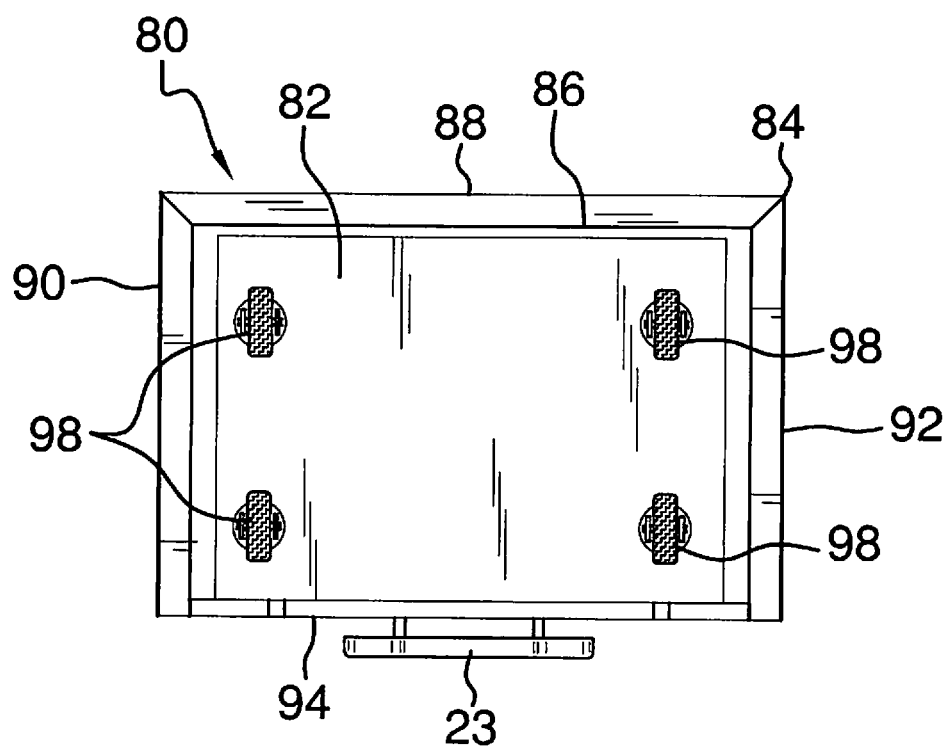
FIG. 5 is a bottom view of an embodiment of the disclosure.
Figure 6:
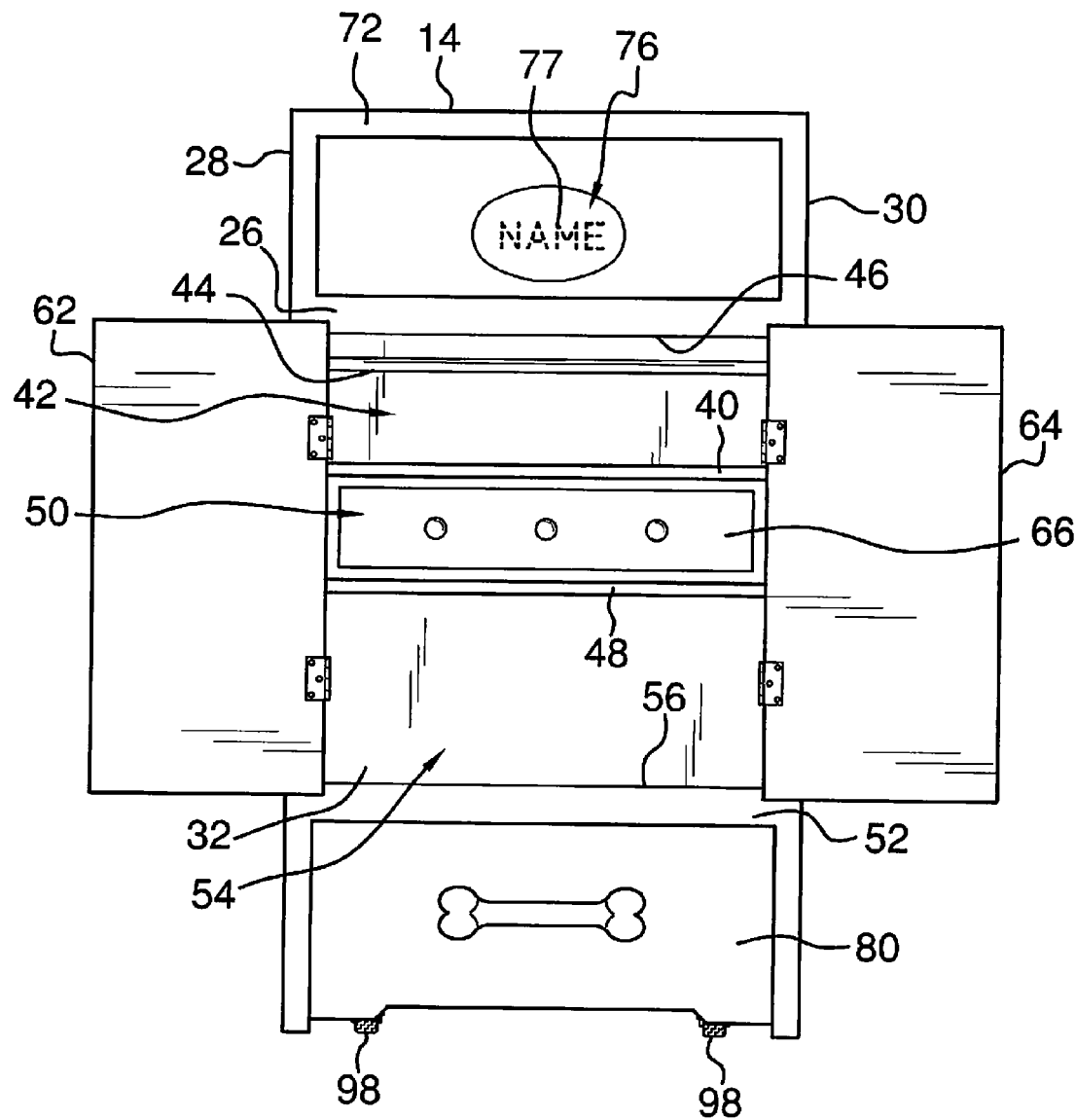
FIG. 6 is a front view of an alternative embodiment of the disclosure.

With reference now to the drawings, and in particular to FIGS. 1 through 6 thereof, a new slidably positionable pet bed device embodying the principles and concepts of an embodiment of the disclosure and generally designated by the reference numeral 10 will be described.

As best illustrated in FIGS. 1 through 6, the slidably positionable pet bed assembly 10 generally comprises a housing 12 that has a top wall 14 and a perimeter wall 16 coupled to and extending downwardly from a perimeter edge 18 of the top wall 14. A front 20 of the housing 12 is open to access an interior of the housing 12. A bottom edge 22 of the perimeter wall 16 may abut a support surface 24 so the housing 12 is supported on the support surface 24. The housing 12 may have a height between 165 cm and 190 cm. The housing 12 may have a depth between 114 cm and 140 cm. The housing 12 may have a width between 89 cm and 106 cm.

An upper shelf 26 is coupled to and extends between a first lateral side 28 and a second lateral side 30 of the perimeter wall 16 of the housing 12. The upper shelf 26 extends from a rear side 32 of the perimeter wall 16 of the housing 12 to a front edge 34 of each of the first 28 and second 30 lateral sides of the perimeter wall 16 of the housing 12. The upper shelf 26 is positioned within the interior of the housing 12 so the upper shelf 26 defines an upper portion 36 of the interior of the housing 12 between the top wall 14 of the housing 12 and the upper shelf 26. The upper portion 36 of the interior of the housing 12 may contain articles relating to pet care. The articles may be positioned on an upper surface 38 of the upper shelf 26. The upper portion 36 may have a height between 63 cm and 89 cm and a width between 86 cm and 103 cm.

A medial shelf 40 is coupled to and extends between the first lateral side 28 and the second lateral side 30 of the perimeter wall 16 of the housing 12. The medial shelf 40 extends from the rear side 32 of the perimeter wall 16 of the housing 12 to the front edge 34 of each of the first 28 and second 30 lateral sides of the perimeter wall 16 of the housing 12. The medial shelf 40 is positioned within the interior of the housing 12 and spaced downwardly from the upper shelf 26 so the medial shelf 40 defines a middle portion 42 of the interior of the housing 12 between the upper 26 and the medial 40 shelves. The middle portion 42 may have a height between 33 cm and 40 cm and a width between 86 cm and 103 cm. A rod 44 may be coupled between the first 28 and second 30 lateral sides of the perimeter wall 16 of the housing 12. The rod 44 may be positioned proximal a bottom side 46 of the upper shelf 26. The rod 44 may removably retain articles relating to pet care such as clothing or other similar items.

A lower shelf 48 is coupled to and extends between the first lateral side 28 and the second lateral side 30 of the perimeter wall 16 of the housing 12. The lower shelf 48 extends from the rear side 32 of the perimeter wall 16 of the housing 12 to the front edge 34 of each of the first 28 and second 30 lateral sides of the perimeter wall 16 of the housing 12. The lower shelf 48 is positioned within the interior of the housing 12 and spaced downwardly from the medial shelf 40 so the lower shelf 48 defines a drawer portion 50 of the interior of the housing 12 between the medial 40 and lower 48 shelves. The drawer portion 50 may have a height between 10 cm and 15 cm and a width between 86 cm and 103 cm.

A bottom shelf 52 is coupled to and extends between the first lateral side 28 and the second lateral side 30 of the perimeter wall 16 of the housing 12. The bottom shelf 52 extends from the rear side 32 of the perimeter wall 16 of the housing 12 to the front edge 34 of each of the first 28 and second 30 lateral sides of the perimeter wall 16 of the housing 12. The bottom shelf 52 is positioned within the interior of the housing 12 and spaced downwardly from the lower shelf 48 so the bottom shelf 52 defines a lower portion 54 of the interior of the housing 12 between the lower 48 and bottom 52 shelves. The lower portion 54 may have a height between 45 cm and 56 cm and a width between 86 cm and 103 cm. The lower portion 54 of the interior of the housing 12 may be used to store articles relating to pet care. The articles may be positioned on an upper surface 56 of the bottom shelf 52.

A primary door 58 is one of a pair of primary doors 60. A first one of the primary doors 62 is hingedly coupled to the front edge 34 of the first lateral side 28 of the perimeter wall 16 of the housing 12. A second one of the primary doors 64 is hingedly coupled to the front edge 34 of the second lateral side 30 of the perimeter wall 16 of the housing 12. Each of the first 62 and second 64 primary doors is positionable in a closed position so the first 62 and second 64 primary doors cover the middle portion 42, the drawer portion 50 and the lower portion 54 of the interior of the housing 12. The first 62 and second 64 primary doors are positionable in an open position to access the middle 42, drawer 50 and lower 54 portions of the interior of the housing 12. Each of the primary doors 60 may have a height between 88 cm and 112 cm. Each of the primary doors 60 may have a width between 44 cm and 53 cm.

A drawer 66 is movably coupled to an inner surface 68 of each of the first 28 and second 30 lateral sides of the perimeter wall 16 of the housing 12. The drawer 66 is positioned within the drawer portion 50 of the interior of the housing 12. The drawer 66 is outwardly extendable from the drawer portion 50 of the interior of the housing 12 so an interior of the drawer 66 is accessible. The drawer 66 may removably contain articles relating to pet care.

A secondary door 70 is hingedly coupled to a front edge 72 of the top wall 14 of the housing 12. The secondary door 70 is positionable in a closed position so the secondary door 70 covers the upper portion 36 of the interior of the housing 12. The secondary door 70 is positionable in an open position to access the upper portion 36 of the interior of the housing 12. The secondary door 70 may have a height between 63 cm and 89 cm. The secondary door 70 may have a width between 86 cm and 103 cm. A pair of hinges 74 is coupled between the secondary door 70 and an associated one of the first 28 and second 30 lateral sides of the perimeter wall 16 of the housing 12. Indicia 76 may be printed on an outer surface 78 of the secondary door 70. The indicia 76 may comprise a name of a pet 77, a breed name, or a combination thereof.

A bed 80 is positioned within the interior of the housing 12. The bed 80 has a bottom wall 82 and a perimeter wall 84 coupled to and extending upwardly from a perimeter edge 86 of the bottom wall 82 of the bed 80. The perimeter wall 84 has a rear side 88, a first lateral side 90, a second lateral side 92, and a front side 94 so the perimeter wall 84 defines a sleeping space 96 that may insertably receive the pet 77. The first lateral side 90 and the second lateral side 92 may each having an arcuate top edge 93,95 respectively, to facilitate access to the bed 80 by the pet 77. The front side 94 of the perimeter wall 84 of the bed 80 has a height that is greater than each of the rear 88, first lateral 90, and second lateral 92 sides of the perimeter wall 84 of the bed 80. The bed 80 may have a width between 84 cm and 94 cm. The bed may have a height between 38 cm and 48 cm. The bed may have a depth between 110 cm and 135 cm.

A plurality of wheels 98 is coupled to the bottom wall 82 of the bed 80 such that each of the wheels 98 is positioned proximal an associated one of four corners 11 of the bottom wall 82 of the bed 80. Each of the wheels 98 abuts the support surface 24 so the bed 80 may be selectively rolled outwardly from a bed space 13 between the bottom shelf 52 and the support surface 24. The bed space 13 may have a width, height and depth sufficient to retain the bed 80 within the bed space 13. The bed 80 may insertably receive the pet 77 when the bed 80 is rolled outwardly from the bed space 13. The bed 80 is selectively rolled inwardly into the bed space 13 so the bed 80 may be stored in the housing 12. A cushion 15 may be positioned within the sleeping space 96 of the bed 80. The pet 77 may be positioned on a top 17 of the cushion 15.

A handle 19 is coupled to a front side 21 of the primary door 58. The handle 19 may be gripped by a user 25 and may have a decorative shaped such as a paw shape. The handle 19 is one of a pair of handles 21. Each of the handles 21 is coupled to an associated one of the pair of primary doors 60. A grip 23 is coupled to the front side 94 of the perimeter wall 84 of the bed 80. The grip 23 may be gripped by the user 25. The grip 23 may have a shape of a dog bone or other ornamental shape relating to the pet 77.

In use, a plurality of articles relating to pet care may be stored within the upper 36, middle 42, and lower portions 54 of the interior housing 12. The bed 80 may be rolled outwardly from the bed space 13 so the pet 77 may sleep on the cushion 15. The bed 80 may be rolled inwardly into the bed space 13 for storage after the pet 77 is awake.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A slidably positionable pet bed assembly comprising:
   a housing having a top wall and a perimeter wall coupled to and extending downwardly from a perimeter edge of said top wall, a front of said housing being open to access an interior of said housing;
   a primary door hingedly coupled said open front side of said housing;
   a drawer positioned within the interior of said housing, said drawer being extendable outwardly from the interior of said housing;
   a secondary door hingedly coupled to said open front side of said housing;
   a bed positioned within the interior of said housing, said bed being extendable outwardly from the interior of said housing; and
   a plurality of wheels coupled to a bottom wall of said bed such that each of said wheels is positioned proximal an associated one of four corners of said bottom wall of said bed, each of said wheels abutting a support surface whereby said bed is configured to be selectively rolled outwardly from the interior of said housing, each of said wheels being positioned exteriorly of said housing when said bed is fully extended from said housing.

2. The assembly according to claim 1, further including a upper shelf coupled to and extending between a first lateral side and a second lateral side of said perimeter wall of said housing such that said upper shelf extends from a rear side of said perimeter wall of said housing to a front edge of each of said first and second lateral sides of said perimeter wall of said housing, said upper shelf being positioned within the interior of said housing whereby said upper shelf defines an upper portion of the interior of said housing between said top wall of said housing and said upper shelf.

3. The assembly according to claim 1, further comprising:
a upper shelf coupled to said housing; and
a medial shelf coupled to and extending between a first lateral side and a second lateral side of said perimeter wall of said housing such that said medial shelf extends from a rear side of said perimeter wall of said housing to a front edge of each of said first and second lateral sides of said perimeter wall of said housing, said medial shelf being positioned within the interior of said housing and spaced downwardly from said upper shelf whereby said medial shelf defines a middle portion of the interior of said housing between said upper and medial shelves.

4. The assembly according to claim 1, further comprising:
a medial shelf coupled to said housing; and
a lower shelf coupled to and extending between a first lateral side and a second lateral side of said perimeter wall of said housing such that said lower shelf extends from a rear side of said perimeter wall of said housing to a front edge of each of said first and second lateral sides of said perimeter wall of said housing, said lower shelf being positioned within the interior of said housing and spaced downwardly from said medial shelf whereby said lower shelf defines a drawer portion of the interior of said housing between said medial and lower shelves.

5. The assembly according to claim 1, further comprising:
a lower shelf coupled to said housing; and
a bottom shelf coupled to and extending between a first lateral side and a second lateral side of said perimeter wall of said housing such that said bottom shelf extends from a rear side of said perimeter wall of said housing to a front edge of each of said first and second lateral sides of said perimeter wall of said housing, said bottom shelf being positioned within the interior of said housing and spaced downwardly from said lower shelf whereby said bottom shelf defines a lower portion of the interior of said housing between said lower and bottom shelves.

6. The assembly according to claim 1, further including a bottom edge of said perimeter wall being configured to abut the support surface whereby said housing is supported on the support surface.

7. The assembly according to claim 1, further including said primary door being one of a pair of primary doors, a first one of said primary doors being hingedly coupled to a front edge of a first lateral side of said perimeter wall of said housing, a second one of said primary doors being hingedly coupled to a front edge of a second lateral side of said perimeter wall of said housing.

8. The assembly according to claim 7, further comprising:
the interior of said housing having a middle portion, a drawer portion and a lower portion; and
each of said first and second primary doors being positionable in a closed position whereby said first and second primary doors cover said middle portion, said drawer portion and said lower portion of the interior of said housing, said first and second primary doors being positionable in a open position to access said middle, drawer and lower portions of the interior of said housing.

9. The assembly according to claim 1, further comprising:
the interior of said housing having a upper portion; and
said secondary door being hingedly coupled to a front edge of said top wall of said housing, said secondary door being positionable in a closed position whereby said secondary door covers said upper portion of the interior of said housing, said secondary door being positionable in an open position to access said upper portion of the interior of said housing.

10. The assembly according to claim 1, further comprising:
the interior of said housing having a drawer portion; and
said drawer being movably coupled to a first lateral side and a second lateral side of said perimeter wall of said housing, said drawer being positioned within said drawer portion of the interior of said housing, said drawer being outwardly extendable from said drawer portion of the interior of said housing whereby an interior of said drawer is accessible.

11. The assembly according to claim 1, further including said bed having a bottom wall and a perimeter wall coupled to and extending upwardly from a perimeter edge of said bottom wall of said bed, said perimeter wall having a rear side, a first lateral side, a second lateral side, and a front side whereby said perimeter wall defines a sleeping space configured to insertably receive a pet, said front side of said perimeter wall having a height being greater than each of said rear, first lateral, and second lateral sides of said perimeter wall of said bed.

12. The assembly according to claim 1, further comprising:
a bottom shelf coupled to and extending between a first lateral side and a second lateral side of said perimeter wall of said housing; and
a bottom edge of said perimeter wall being configured to abut the support surface;
each of said wheels abutting the support surface whereby said bed is configured to be selectively rolled outwardly from a bed space between said bottom shelf and the support surface, whereby said bed is configured to insertably receive the pet when said bed is rolled outwardly from said bed space, said bed being selectively rolled inwardly toward said bed space whereby said bed is configured to be stored in said housing.

13. The assembly according to claim 1, further including a handle coupled to a front side of said primary door, said handle being configured to be gripped by a user.

14. The assembly according to claim 13, further comprising:
said door being one of a pair of doors; and
said handle being one of a pair of handles, each of said handles being coupled to an associated one of said pair of primary doors.

15. The assembly according to claim 1, further comprising:
said bed having a perimeter wall, said perimeter wall having a front side; and
a grip coupled to said front side of said perimeter wall of said bed, said grip being configured to be gripped by a user.

16. A slidably positionable pet bed assembly comprising:
a housing having a top wall and a perimeter wall coupled to and extending downwardly from a perimeter edge of said top wall, a front of said housing being open to access an interior of said housing, a bottom edge of said perimeter wall being configured to abut a support surface whereby said housing is supported on the support surface;
a upper shelf coupled to and extending between a first lateral side and a second lateral side of said perimeter wall of said housing such that said upper shelf extends from a rear side of said perimeter wall of said housing to a front edge of each of said first and second lateral sides of said perimeter wall of said housing, said upper shelf being positioned within the interior of said housing whereby said upper shelf defines an upper portion of the interior of said housing between said top wall of said housing and said upper shelf;

a medial shelf coupled to and extending between said first lateral side and said second lateral side of said perimeter wall of said housing such that said medial shelf extends from said rear side of said perimeter wall of said housing to said front edge of each of said first and second lateral sides of said perimeter wall of said housing, said medial shelf being positioned within the interior of said housing and spaced downwardly from said upper shelf whereby said medial shelf defines a middle portion of the interior of said housing between said upper and medial shelves;

a lower shelf coupled to and extending between said first lateral side and said second lateral side of said perimeter wall of said housing such that said lower shelf extends from said rear side of said perimeter wall of said housing to said front edge of each of said first and second lateral sides of said perimeter wall of said housing, said lower shelf being positioned within the interior of said housing and spaced downwardly from said medial shelf whereby said lower shelf defines a drawer portion of the interior of said housing between said medial and lower shelves;

a bottom shelf coupled to and extending between said first lateral side and said second lateral side of said perimeter wall of said housing such that said bottom shelf extends from said rear side of said perimeter wall of said housing to said front edge of each of said first and second lateral sides of said perimeter wall of said housing, said bottom shelf being positioned within the interior of said housing and spaced downwardly from said lower shelf whereby said bottom shelf defines a lower portion of the interior of said housing between said lower and bottom shelves;

a primary door being one of a pair of primary doors, a first one of said primary doors being hingedly coupled to said front edge of a first lateral side of said perimeter wall of said housing, a second one of said primary doors being hingedly coupled to said front edge of said second lateral side of said perimeter wall of said housing, each of said first and second primary doors being positionable in a closed position whereby said first and second primary doors cover said middle portion, said drawer portion and said lower portion of the interior of said housing, said first and second primary doors being positionable in a open position to access said middle, drawer and lower portions of the interior of said housing;

a drawer being movably coupled to said first lateral side and said second lateral side of said perimeter wall of said housing, said drawer being positioned within said drawer portion of the interior of said housing, said drawer being outwardly extendable from said drawer portion of the interior of said housing whereby an interior of said drawer is accessible;

a secondary door hingedly coupled to a front edge of said top wall of said housing, said secondary door being positionable in a closed position whereby said secondary door covers said upper portion of the interior of said housing, said secondary door being positionable in an open position to access said upper portion of the interior of said housing;

a bed positioned within the interior of said housing, said bed having a bottom wall and a perimeter wall coupled to and extending upwardly from a perimeter edge of said bottom wall of said bed, said perimeter wall having a rear side, a first lateral side, a second lateral side, and a front side whereby said perimeter wall defines a sleeping space configured to insertably receive a pet, said front side of said perimeter wall having a height being greater than each of said rear, first lateral, and second lateral sides of said perimeter wall of said bed;

a plurality of wheels coupled to said bottom wall of said bed such that each of said wheels is positioned proximal an associated one of four corners of said bottom wall of said bed, each of said wheels abutting the support surface whereby said bed is configured to be selectively rolled outwardly from a bed space between said bottom shelf and the support surface, whereby said bed is configured to insertably receive a pet when said bed is rolled outwardly from said bed space, said bed being selectively rolled inwardly into said bed space whereby said bed is configured to be stored in said housing;

a handle coupled to a front side of said primary door, said handle being configured to be gripped by a user, said handle being one of a pair of handles, each of said handles being coupled to an associated one of said pair of primary doors; and a grip coupled to said front side of said perimeter wall of said bed, said grip being configured to be gripped by a user.

17. The assembly of claim 2, further comprising a rod being coupled to and extending between a first lateral side and a second lateral side of said perimeter wall of said housing, said rod being positioned proximal a bottom side of said upper shelf.

18. The assembly of claim 11, further comprising a cushion being positioned within said sleeping space of said bed.

* * * * *